United States Patent [19]

Chang et al.

[11] Patent Number: 5,193,136
[45] Date of Patent: Mar. 9, 1993

[54] PROCESS FOR MAKING MULTIFUNCTION INTEGRATED OPTICS CHIPS HAVING HIGH ELECTRO-OPTIC COEFFICIENTS

[75] Inventors: Chin L. Chang, West Covina; Daniel A. Niebauer; Albert Choi, both of Woodland Hills, all of Calif.

[73] Assignee: Litton Systems, Inc., Woodland Hills, Calif.

[21] Appl. No.: 799,716

[22] Filed: Nov. 26, 1991

Related U.S. Application Data

[63] Continuation of Ser. No. 702,140, May 31, 1991, abandoned, which is a continuation of Ser. No. 428,174, Oct. 27, 1989, abandoned.

[51] Int. Cl.$^5$ .............................................. G02B 6/10
[52] U.S. Cl. ..................................... 385/129; 385/14; 385/130; 385/132
[58] Field of Search .......................... 360/96.11, 96.12; 385/14, 129, 130, 132

[56] References Cited

U.S. PATENT DOCUMENTS

| | | | |
|---|---|---|---|
| 3,888,648 | 6/1975 | West et al. ................................ | 65/30 |
| 4,400,052 | 8/1983 | Alferness et al. ................ | 350/96.11 |
| 4,547,262 | 10/1985 | Spillman, Jr. et al. .......... | 156/659.1 |
| 4,765,702 | 8/1988 | Dohan et al. ..................... | 350/96.12 |
| 4,871,226 | 10/1989 | Courtney et al. ............. | 350/96.11 X |

OTHER PUBLICATIONS

Dawar et al., "Guided-Wave Acoust-Optic Interaction in Proton Exchanged Y-cut LiNbO$_3$", Appl. Phys. Lett. 48(23), Jun. 9, 1986.
Becker, "Comparison of Guided-Wave Interferometric Modulators Fabricated on LiNbO$_3$ via Ti Indiffusion and Proton Exch." Ap. Phlt. 43(2) Jul. 15, 1983.
Spillman et al., "Optical Waveguides in LiTaO$_3$ Formed by Proton Exchange", Optics Letters vol. 8, No. 9 Sep. 1983.
Gonzalez et al., "Diffusion of Dueterium and Hydrogen in Crystalline LiNbO$_3$", Appl. Phys. Lett. 41(8), Oct. 15, 1982.
Goodwin et al., "Proton-Exchanged Optical Waveguides in Y-cut Lithium Niobate", Electronics Letters 19(6), Mar. 17, 1983.
Leonberger et al., "LiNbO$_3$ and LiTaO$_3$ Integrated Optic Components for Fiber Optic Sensors" /vol. 44, Sep. 18-20, 1989/Optical Fiber Sensors, Springer Proc. Phys.

(List continued on next page.)

Primary Examiner—John D. Lee
Assistant Examiner—Stephen W. Barns

[57] ABSTRACT

Methods for making proton-exchanged, multi-function integrated optics chips, preferably chips based on the stable, rhombohedral lithium niobate structure, and having substantially diffused protons, while being substantially free of microcracking and of internal stresses that can result in microcracking, and yet having optimally high electro-optic coefficients, include the steps of: forming a multi-function integrated optics chip substrate from a substrate such as lithium niobate; affixing a removable mask or mask pattern to at least one surface of the chip to form one or more proton-exchanged patterns of desired size and shape at the surface of the chip; treating the masked chip with a proton-exchanging acid such as benzoic acid at a temperature and for a time sufficient to cause substantial proton exchange at and below the unmasked surface of the chip, but for a time insufficient to create any microcracking or internal stresses that lead to microcracking in the chip; removing the mask or mask pattern from the chip; and thermally annealing the chip, in an oxygen-containing environment, at a temperature and for a time sufficient to diffuse the hydrogen ions at and near the surface of the chip substantially below its surface, at a temperature and for a time sufficient to optimize the polarization extinction ratio of the chip, and for a time and at a temperature sufficient to restore and to optimize the electro-optic coefficient and to reduce light and propagation losses in the chip.

28 Claims, 2 Drawing Sheets

OTHER PUBLICATIONS

Veselka et al., "Low-Insertion-Loss Channel Waveguides in LiNbO$_3$ Fabricated by Proton Exchange"/Mar. 12, 1987 vol. 23, #6, Electronics Lett.

Choudhury et al., "Ion Implantation of Si in Be-implanted InGaAs" Apr. 1, 1982./Appl. Phys. Lett. 40(7).

Jacke et al., "Damage-resistant LiNbO$_3$ waveguides"/Jan. 1, 1984/J. Appl. Phys. 55(1).

Suchoski et al., "Low-loss high-extinction polarizers fabricated in LiNbO$_3$ by proton exchange"/Feb. 1988/Optics Letters, vol. 13, #2.

Finkaldy et al., "Singl3-Mode Transmission Selective Integrated-Optical Polarisers in LiNbO$_3$"/Feb. 2, 1984/vol. 20, #3, Electronics Lett.

Suchoski et al., "Stable low-loss proton-exchanged LiNbO$_3$ waveguide devices with no electro-optic degradation"/Optics Letters-Nov. 1988, vol. 3.

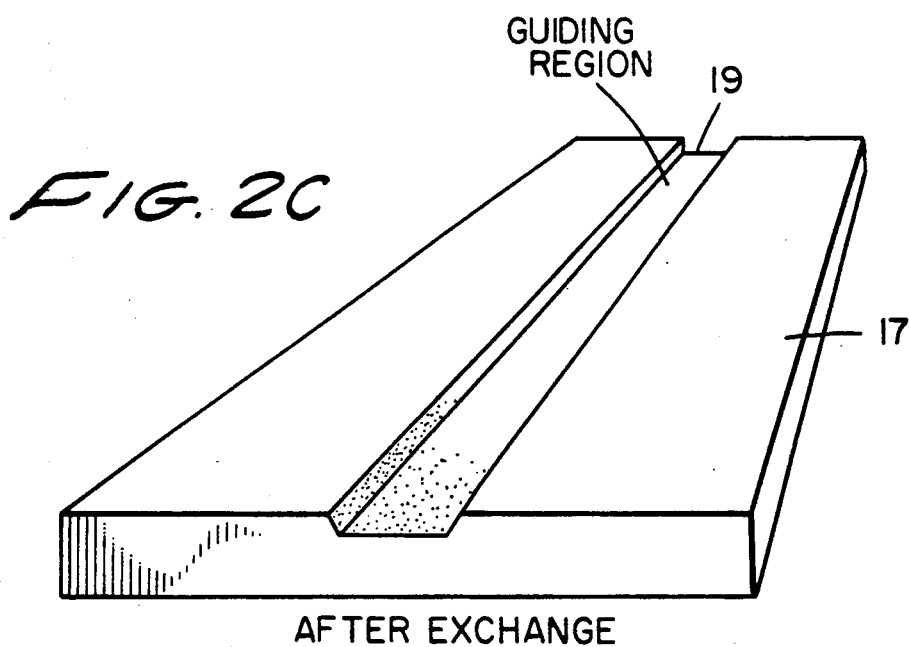
AFTER EXCHANGE
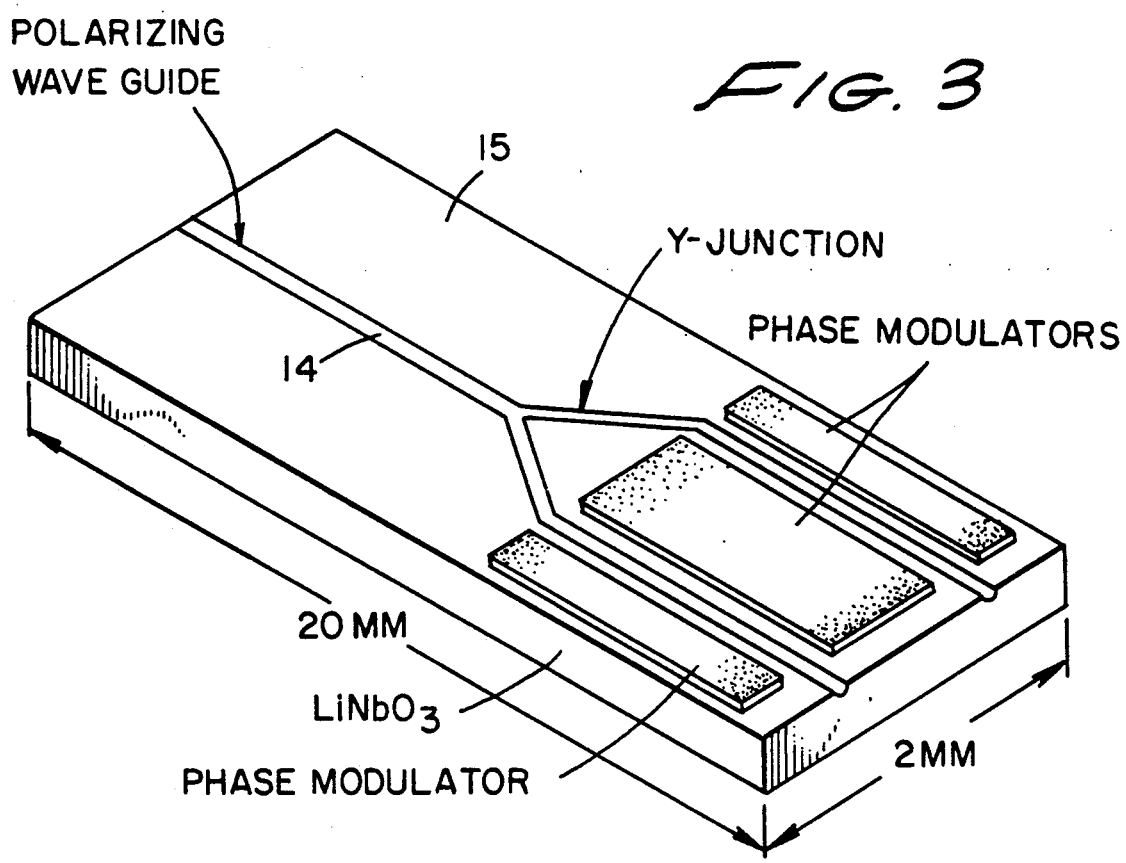

PROCESS FOR MAKING MULTIFUNCTION INTEGRATED OPTICS CHIPS HAVING HIGH ELECTRO-OPTIC COEFFICIENTS

This application is a continuation-in-part of application Ser. No. 07/702,140 filed May 31, 1991, which is a continuation of U.S. application Ser. No. 07/428,174, filed Oct. 27, 1989 by Chin L. Chang, Daniel A. Niebauer, and Albert Choi for "PROCESS FOR MAKING MULTIFUNCTION INTEGRATED OPTICS CHIPS HAVING HIGH ELECTRO-OPTIC COEFFICIENTS", both now abandoned.

BACKGROUND OF THE INVENTION

1. Field of the Invention

This invention relates to processes for making multifunction integrated optics chips having optimally high electro-optic coefficients, and proton-exchanged, preferably rhombohedral structure, and to the multifunction integrated optics chips resulting from these processes.

2. Description of Related Art

Until now, the methods for making multifunction integrated optics chips, particularly such chips made of lithium niobate, have included the step of subjecting the chips to proton exchange with acids such as benzoic acid at temperatures in the range of about 150° C. to about 250° C. for times of about 10 to about 20 minutes or more. Where the proton exchange step is carried out at higher temperatures or for longer times, or both, the lithium niobate substrates tend to form substantial internal stresses that result in microcracking in the substrate areas exposed to the proton exchange step. As a result, the chips made by processes including this step frequently exhibit refractive index instabilities, high propagation losses, and low electro-optic coefficients.

SUMMARY OF THE INVENTION

This invention provides methods for making proton-exchanged, multifunction integrated optics chips (MIOCS) that are, in preferred embodiments, based on the stable rhombohedral $Li_{1-x}H_xNbO_3$ structure. These chips have substantially diffused protons, are substantially free of microcracking and of internal stresses that can result in microcracking, and yet have optimally high electro-optic coefficients. These methods are particularly adapted for making such chips from proton-exchanged lithium niobate.

These methods include the steps of: forming a multifunction integrated optics chip substrate from a substrate such as lithium niobate; affixing a removable mask or mask pattern to at least one surface of the chip to form one or more proton-exchanged patterns of desired size and shape at the surface of the chip; treating the masked chip with a proton-exchanging acid such as benzoic acid at a temperature and for a time sufficient to cause substantial proton exchange at and below the unmasked surface of the chip, but for a time insufficient to create any microcracking or internal stresses that lead to microcracking in the chip; removing the mask or mask pattern from the chip; and thermally annealing the chip, in an oxygen-containing environment, at a temperature and for a time sufficient to diffuse the hydrogen ions at and near the surface of the chip substantially below its surface, and for a time and at a temperature sufficient to restore and to optimize the electro-optic coefficient of the chip.

This invention also relates to multifunction integrated optics chips having a proton-exchanged lithium niobate surface or surface pattern of desired size and shape with the proton-exchanged hydrogen ions substantially diffused into and below the surface of the chip. These chips exhibit the stable rhombohedral structure and the smaller stresses that lead to microcracking and substantially free of microcracking in their proton-exchanged regions. These chips also have restored, optimized electro-optic coefficients substantially equal to the electro-optic coefficients of the chips before proton exchange begins.

In preferred embodiments, the multifunction integrated optics chips are formed of a substance such as lithium niobate. These chips can be of any desired size and shape and thickness. Alternatively, these chips can be made of substances such as $LiTaO_3$ (lithium tantalate).

In preferred embodiments, the wafers to be converted to MIOCS are covered, on one or more of their surfaces, with a mask or masking pattern, such as a mask made of aluminum or chromium metal. These masks preferably include a pattern of sufficient size and shape to form a desired pattern of electro-optic channels in the wafers.

Before or after masking, the lithium niobate wafers are treated with an acid that causes proton exchange between the hydrogen ions in the acid and the anions, e.g., lithium ions, in the wafers. The acid treatment takes place at elevated temperature, preferably in the range of about 100° C. to about 250° C., and for a time in the range of a few minutes up to as many as 20 or even 30 minutes. The temperatures and times of proton exchange are, in general, sufficient to cause substantial proton exchange in the desired areas of the wafers, but sufficiently short to avoid the creation of stresses that lead to microcracking, or to the formation of microcracks, in the wafer regions exposed to proton exchange.

The proton exchange step is preferably controlled so as to limit the depth of proton exchange below the surface of the wafer to not more than about 5 microns and preferably not more than about 2 microns. To this end, proton exchange time is preferably limited to no more than about 10 minutes up to about 15 minutes. The exchange time should preferably not exceed the time required to convert substantially 100% of the lithium ions to hydrogen ions at the surface of the wafer, and to convert substantially 100% of the lithium ions to hydrogen ions below the surface to a depth of not more than about 5 microns and preferably not more than about 2 microns.

After proton exchange is complete, the mask or masking pattern is removed. Thereafter, the wafer is heat-treated, i.e., thermally annealed, in an environment that contains more oxygen than air normally contains, and preferably in sufficient amounts and at sufficient temperatures and for sufficient times, to diffuse the hydrogen ions, formed at and near the surface of the chip, substantially into and below the surface of the chip. The heat treatment also converts the phase of the wafer, where the wafer is lithium niobate, from Perovskite, an unstable phase, to rhombohedral, a more stable phase.

Preferably, the annealing step is carried out for a time and at a temperature sufficient to reduce the hydrogen concentration at the surface of the wafer from about 100% to a value in the range of about 20% to about 30% and preferably less than about 25%. In broader terms, the annealing step is continued until the electro-optic coefficient of the wafer before proton exchange is substantially recovered, and optical propagation losses caused by proton exchange are reduced or substantially eliminated.

The annealing step is, in some embodiments, carried out for a time sufficient to maximize the coupling between the waveguide in the wafer and the core of an optical fiber to be joined to the waveguide. In such embodiments, the annealing is carried out until the spot size of light emerging from the core of a fiber to be coupled to the waveguide corresponds substantially to the spot size of light passing through and emerging from the waveguide itself. In such embodiments, hydrogen diffusion into the waveguide will penetrate to a depth in the range of about 5 to about 7 microns.

In preferred embodiments, the annealing is carried out by increasing gradually the temperature of the annealing from room temperature, e.g., about 20° C., up to a desired maximum temperature, preferably in the range of about 325° C. to about 375° C., over a time period of up to about 30 minutes, but preferably as rapidly as possible. The annealing continues at the maximum temperature for a time sufficient to cause the desired diffusion of hydrogen ions into the wafer and to restore the electro-optic coefficient of the wafer to optimum value, i.e., to a value at or near the value of the wafer before exposure to proton exchange and annealing.

The annealing takes place in a chamber that is exposed to air or oxygen. Preferably, oxygen flows into the annealing chamber at a rate in the range of about 0.1 liter per minute to about 0.5 liter per minute. This oxygen flow is maintained throughout the annealing step.

BRIEF DESCRIPTION OF THE DRAWINGS

This invention can better be understood by reference to the drawings, in which:

FIG. 2C shows the guiding region formed in a chip by the proton-exchanging step of this method; and FIG. 3 shows an embodiment of a finished product of the methods of this invention.

DESCRIPTION OF THE PREFERRED EMBODIMENTS

Figure 1:
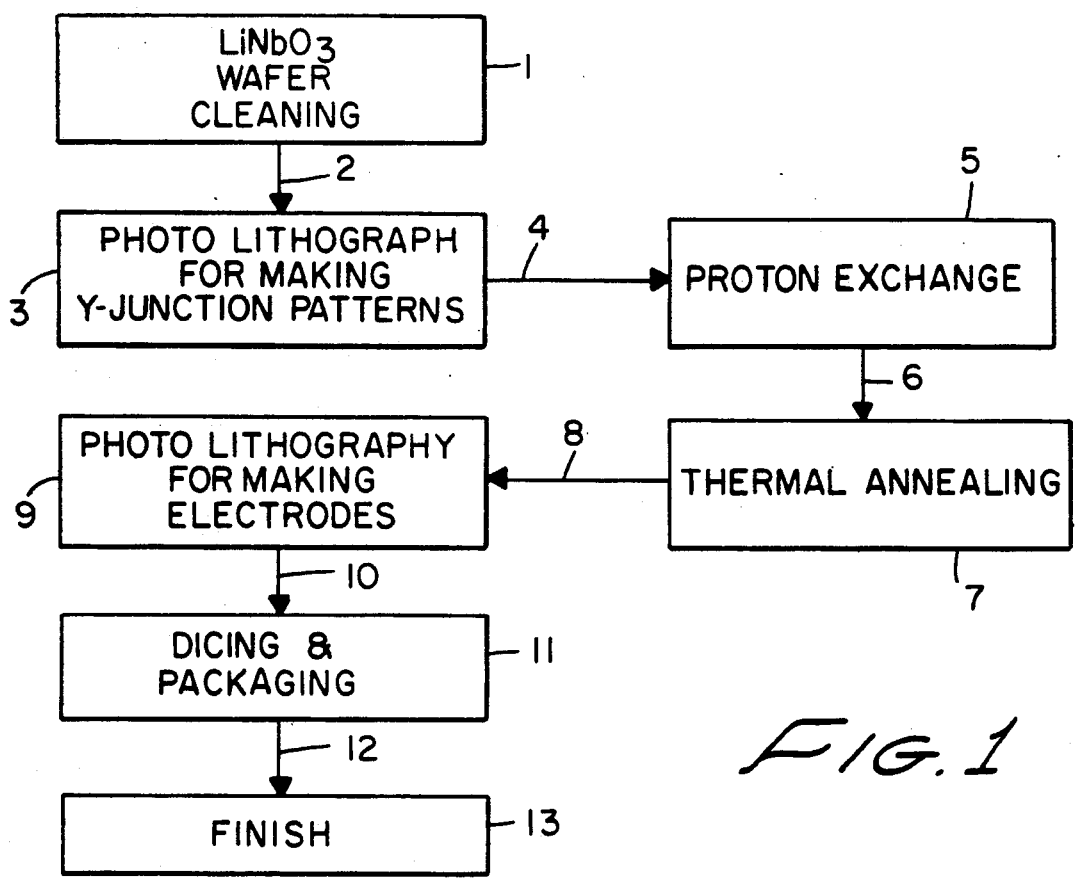
FIG. 1 is a block flow diagram showing a preferred method for making proton-exchanged integrated optics chips.

FIG. 1 shows, in block diagram form, a preferred embodiment of the methods of this invention. In this process, a lithium niobate wafer, after cleaning in step 1 passes via path 2 to masking step 3. The masking comprises placing an aluminum mask, by photolithography, on the lithium niobate wafer to form a Y-junction pattern. From masking step 3, the masked lithium niobate wafer passes on path 4 to proton exchange step 5.

Figure 2A:
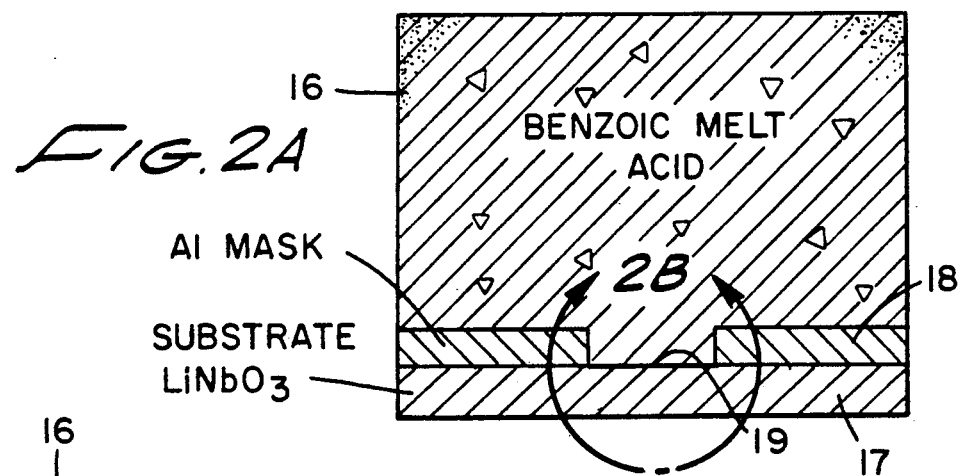
FIG. 2A and FIG. 2B shows the proton-exchanging step of the methods of this invention.
Figure 2B:
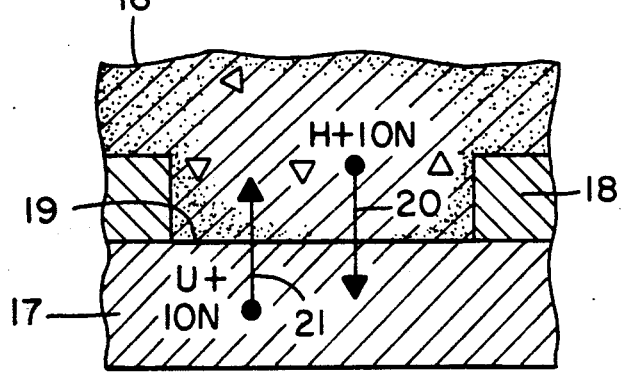

There, as seen in FIG. 2A and FIG. 2B, the benzoic acid melt 16 impinges on the entire surface of masked wafer 17. However, because mask 18 blocks all portions of the wafer except unmasked area 19, hydrogen ion exchange for lithium ions is confined to area 19, preferably to a depth of about 2 microns below the surface of the wafer in area 19. In area 19, hydrogen ions enter on path 20 and lithium ions leave on path 21. The proton-exchanged wafer 17, after this step, includes proton-exchanged guiding region 19; see FIG. 2C. Thereafter, proton-exchanged, masked lithium niobate wafer 17 passes on path 6 to thermal annealing step 7.

There, the masked substrate is subjected to thermal annealing at a temperature that gradually increases from about 20° C. up to a desired maximum that is preferably in the range of about 325° C. to about 375° C. over a period of up to about 30 minutes, but preferably as quickly as possible. The annealing causes hydrogen ions to diffuse into the wafer in the proton-exchanged area to a depth in the range of about five to about seven microns. At the end of the thermal annealing step, the wafer passes on path 8 to photolithographic step 9 where, using conventional photolithographic processes, electrodes are formed on the substrate. The wafer then passes on path 10 to a dicing and packaging step 11 where the wafer is cut into products of desired size and shape before passing on path 12 to finishing step 13.

FIG. 3 shows a preferred embodiment of a finished product with the hydrogen ion-exchanged, thermally annealed, Y-shaped polarizing waveguide 14 formed on the surface of wafer 15.

What is claimed is:

1. A method for making at least one proton-exchanged optical waveguide in the surface of a substrate of electro-optic material, wherein at least one end of said at least one optical waveguide is adapted to be coupled to a core of an optical fiber, the method comprising:

affixing a removable mask or mask pattern to at least one surface of said substrate, said mask or mask pattern having at least one aperture that delineates said at least one waveguide;

treating the masked substrate with a proton-exchanging acid to expose said at least one aperture to hydrogen ions at a temperature and for a time sufficient to cause substantial proton exchange at and below the exposed surface of said substrate, but for a time insufficient to create substantial microcracking or internal stresses that lead to microcracking in said substrate;

removing the mask or mask pattern from said substrate; and thermally annealing said substrate, in the presence of oxygen, at a temperature and for a time sufficient to diffuse hydrogen ions at and near said exposed surface into said substrate to a depth sufficient to reduce losses in said optical waveguide to no more than about $-1$ dB/cm, to reduce coupling losses to no more than $-1$ dB from any said core to said one end of said at least one optical waveguide, and to restore the electro-optic coefficient of said chip substrate, said at least one optical waveguide having a polarization extinction ratio of no more than about $-55$ dB.

2. The method of claim 1 wherein said substrate is formed from lithium niobate.

3. The method of claim 1 further comprising using benzoic acid as said proton-exchanging acid.

4. The method of claim 1 wherein said treating takes place at a temperature in the range of about 100° C. to about 250° C. and for a time of up to about 2 minutes.

5. The method of claim 1 further comprising carrying out said annealing at a temperature in the range of about 325° C. to about 375° C.

6. The method of claim 1 wherein said annealing is carried out in a chamber substantially impermeable to gases and further comprising, during said annealing, flowing oxygen into said chamber at a rate in the range of about 0.1 to about 0.4 liters per minute.

7. The method of claim 1 wherein said annealing is carried out for a time and at a temperature sufficient to restore the electro-optic coefficient of said chip substrate to the value of said electro-optic coefficient before said treating with a proton-exchanging acid.

8. An integrated optics chip comprising a substrate formed from electro-optic material with at least one proton-exchanged optical waveguide formed in a surface of said substrate, said optical waveguide having:
   proton-exchanged hydrogen ions substantially diffused into and below the surface of said optical waveguide;
   a rhombohedral structure;
   at least one input port to said at least one optical waveguide for light and at least one output port from said at least one optical waveguide for light;
   a polarization extinction ratio of no more than about −55 dB;
   coupling loses of not more than about −3 dB of optical power from said output port with respect to optical power into said input port; and
   a restored electro-optic coefficient, said substrate being substantially free of stresses that lead to microcracking, and substantially free of microcracks, in the proton-exchanged waveguide regions of said substrate.

9. The chip of claim 8 wherein said substrate is formed of lithium niobate and proton-exchanged lithium niobate.

10. An integrated optics chip having:
    a substrate formed from electro-optical material;
    at least one optical waveguide having a proton-exchanged structure of desired size and shape in the surface of said substrate with proton-exchanged hydrogen or deuterium ions diffused substantially into and below the surface of said waveguide;
    at least one input port to said at least one optical waveguide for light and at least one output port from said at least one optical waveguide for light;
    a polarization extinction ratio in said optical waveguide of no more than about −55 dB;
    coupling losses of not more than about −3 dB of optical power from said output port with respect to optical power into said input port;
    said chip being substantially free of stresses that lead to microcracking and substantially free of microcracks in the proton-exchanged regions of said chip.

11. The integrated optics chip of claim 10 wherein at least one of said waveguides further comprises:
    proton-exchanged hydrogen or deuterium ions in a pattern with a controlled size, depth and shape that is adapted for coupling an end face of said waveguide to an optic fiber core of substantially the same size and shape as said end face.

12. A method for making at least one proton-exchanged optical waveguide in a substrate of electro-optic material, the method comprising:
    affixing a removable mask or mask pattern to at least one surface of said substrate, said mask or mask pattern having at least one aperture that delineates said at least one waveguide to be formed in said substrate;
    treating the masked substrate with a proton-exchanging acid at a temperature and for a time sufficient to cause substantial proton exchange at and below the surface of said substrate, but for a time insufficient to create substantial microcracking or internal stresses that lead to microcracking in said substrate;
    removing the mask or mask pattern from said substrate; and
    thermally annealing said substrate, in the presence of oxygen, at a temperature and for a time sufficient to diffuse hydrogen ions at and near the surface of said substrate substantially below the surface of said substrate, sufficient to reduce optical waveguide coupling losses to no more than about −3 dB, and sufficient to produce a polarization extinction ratio of no more than about −55 dB in said optical waveguide, and to restore the electro-optic coefficient of said substrate.

13. The method of claim 12 further comprising limiting the time of treating with said proton-exchanging acid so that the depth of proton exchange below the surface of said at least one optical waveguide is not greater than about two microns.

14. The method of claim 12 wherein the time of said annealing is controlled so that the hydrogen ions penetrate to a depth not greater than about seven microns below the surface of said at least one optical waveguide.

15. A method for making at least one proton-exchanged optical waveguide in the surface of a substrate of electro-optic material wherein at least one end of said at least one optical waveguide is adapted to be coupled to a core of an optical fiber, the method comprising:
    affixing a removable mask or mask pattern to at least one surface of said substrate, said mask or mask pattern having at least one aperture that delineates said at least one optical waveguide;
    treating the masked substrate with a proton-exchanging acid to expose said at least one aperture to hydrogen ions at a temperature and for a time sufficient to cause substantial proton exchange at and below the surface of said substrate, but for a time insufficient to create substantial microcracking or internal stresses that lead to microcracking in said substrate;
    removing said mask or mask pattern from said substrate; and
    thermally annealing said substrate, in the presence of oxygen, at a temperature and for a time sufficient to diffuse the hydrogen ions at and near the exposed surface of said substrate into the surface of said substrate to a depth sufficient to produce at least one optical waveguide in said substrate having a polarization extinction ratio of no more than about −55 dB, and to restore the electro-optic coefficient of said substrate.

16. The method of claim 15 comprising forming said chip substrate from lithium niobate.

17. The method of claim 15 further comprising using benzoic acid as said proton-exchanging acid.

18. The method of claim 15 wherein said treating takes places at a temperature in the range of about 100° C. to about 250° C. and for a time of up to about 30 minutes.

19. The method of claim 15 further comprising carrying out said annealing at a temperature in the range of about 325° C. to about 375° C.

20. The method of claim 15 wherein said annealing is carried out in a chamber substantially impermeable to gases and further comprising, during said annealing, flowing oxygen into said chamber at a rate in the range of about 0.1 to about 0.4 liters per minute.

21. The method of claim 15 wherein said annealing is carried out for a time and a temperature sufficient to restore the electro-optic coefficient of said chip substrate to the value of said electro-optic coefficient before said treating with a proton-exchanging acid.

22. An integrated optics chip comprising a substrate made of electro-optic material with at least one proton-exchanged optical waveguide in a surface of said substrate, said optical waveguide having:
   proton-exchanged hydrogen ions substantially diffused into and below the surface of said substrate;
   a rhombohedral structure;
   a polarization extinction ratio of no more than about $-55$ dB; and
   a restored electro-optic coefficient substantially equal to the electro-optic coefficient of said substrate before proton-exchanging.

23. The chip of claim 22 wherein said substrate is formed of lithium niobate and proton-exchanged lithium niobate.

24. An integrated optics chip comprising a substrate formed from electro-optic material with at least one proton-exchanged optical waveguide formed in a surface of said substrate, said waveguide having:
   proton-exchanged hydrogen or deuterium ions substantially diffused into and below the surface of said substrate, and a polarization extinction ratio of no more than about $-55$ dB, said substrate being substantially free of stresses that lead to microcracking and substantially free of microcracks in the proton-exchanged regions of said substrate.

25. The integrated optics chip of claim 24 further comprising at least one optical waveguide in which said proton-exchanged hydrogen or deuterium ions have a size and shape that is adapted for coupling to a fiber optical fiber having a core of substantially the same size and shape as said waveguide.

26. A method for making at least one proton-exchanged optical waveguide in the surface of a substrate of electro-optic material, the method comprising:
   treating selected surface areas of said substrate with a proton-exchanging acid, at a temperature and for a time sufficient to cause substantial proton exchange at and below said selected surface areas, but for a time insufficient to create substantial microcracking or internal stresses that lead to microcracking in said substrate at said selected surfaces areas; and
   thermally annealing said substrate, in the presence of oxygen, at a temperature and for a time sufficient to diffuse hydrogen ions at or near the surface of the substrate to a depth sufficient to produce said at least one optical waveguide with a polarization extinction ratio of no more than about $-55$ dB.

27. The method of claim 26 further comprising limiting the treating of said substrate with said proton-exchanging acid so that the depth of proton exchange below the surface of said substrate is not greater than about two microns.

28. The method of claim 26 wherein the time of said annealing is controlled so that the hydrogen ions penetrate to a depth not greater than about seven microns below the surface of said substrate.

* * * * *